(12) United States Patent
Duerre et al.

(10) Patent No.: US 12,209,610 B2
(45) Date of Patent: Jan. 28, 2025

(54) ELASTIC BEARING

(71) Applicant: Vibracoustic SE, Darmstadt (DE)

(72) Inventors: Markus Duerre, Neuenburg am Rhein (DE); Jennifer Arnold, Schliengen (DE); Karsten Terhardt, Neuenburg am Rhein (DE); Frederik Goetz, Breisach (DE)

(73) Assignee: Vibracoustic SE, Darmstadt (DE)

( * ) Notice: Subject to any disclaimer, the term of this patent is extended or adjusted under 35 U.S.C. 154(b) by 301 days.

(21) Appl. No.: 17/583,430

(22) Filed: Jan. 25, 2022

(65) Prior Publication Data

US 2022/0235819 A1 Jul. 28, 2022

(30) Foreign Application Priority Data

Jan. 28, 2021 (DE) .......................... 102021101999.0

(51) Int. Cl.
*F16C 27/02* (2006.01)
*F16F 1/38* (2006.01)

(52) U.S. Cl.
CPC ................. *F16C 27/02* (2013.01); *F16F 1/38* (2013.01)

(58) Field of Classification Search
CPC .......... F16F 15/02; F16F 7/1005; F16F 15/04; F16F 15/08; F16F 1/3935; F16F 15/00;
(Continued)

(56) References Cited

U.S. PATENT DOCUMENTS 2,482,488 A * 9/1949 Julien ....................... F16F 3/00
403/228
4,531,761 A * 7/1985 von Sivers ............ F16F 1/3732
267/293
(Continued)

FOREIGN PATENT DOCUMENTS

CN 109340287 A * 2/2019
CN 110709612 A * 1/2020
(Continued)

OTHER PUBLICATIONS

Extended European Search Report 21213198, dated Jun. 28, 2022.
(Continued)

*Primary Examiner* — Bradley T King
*Assistant Examiner* — Mahbubur Rashid
(74) *Attorney, Agent, or Firm* — Fishman Stewart PLLC

(57) ABSTRACT

An elastic bearing comprising a mass having at least one mounting hole for a mounting sleeve, the mounting hole having a central longitudinal axis passing therethrough, at least one mounting sleeve having a collar section extending in the radial direction and a shaft section extending in the longitudinal direction, the mounting sleeve being fixed in the mounting hole, and an elastomeric body arranged on the outer circumferential side of the mounting sleeve. In an embodiment, the elastomer body has, in the region of the shaft section, a diameter-widening contour whose diameter increases with increasing longitudinal distance from the collar section, and the mounting hole having a diameter-widening contour which widens to the same extent as the diameter-widening contour of the elastomer body. In embodiments, the elastomer body is prestressed by the mass and the mounting sleeve at least in the radial direction.

10 Claims, 2 Drawing Sheets

(58) Field of Classification Search
CPC .. F16F 1/36; F16F 1/373; F16F 1/3732; F16F 1/38; F16F 13/24; F16F 7/08; F16F 1/3814; F16F 1/393; F16F 15/1208; F16F 1/3735; F16F 2230/007; F16F 2230/02; B64C 27/001; B64C 2027/005; B64C 27/35; F16C 27/02; F16C 17/03; F16C 27/00; F16C 35/02; F16C 25/083

See application file for complete search history.

(56) References Cited

U.S. PATENT DOCUMENTS

| | | | |
|---|---|---|---|
| 4,744,677 A | | 5/1988 | Tanaka et al. |
| 4,911,417 A | * | 3/1990 | Short .................. B60G 7/00 |
| | | | 403/368 |
| 6,065,742 A | * | 5/2000 | Whiteford ............. F16F 7/108 |
| | | | 267/141.5 |
| 6,893,010 B2 | * | 5/2005 | Groth ................. F16F 1/3935 |
| | | | 267/141.1 |
| 7,044,457 B2 | * | 5/2006 | Bucksbee ............ F16F 1/3935 |
| | | | 267/141.1 |
| 7,954,793 B2 | * | 6/2011 | Weisbeck ............. F16F 1/3935 |
| | | | 267/140.3 |
| 7,967,282 B2 | * | 6/2011 | Boyd .................. F16F 3/0935 |
| | | | 267/293 |
| 10,829,234 B2 | * | 11/2020 | Zameroski ............ F16F 15/02 |
| 2002/0140146 A1 | * | 10/2002 | Nakagawa ........... F16F 1/3873 |
| | | | 267/141.2 |
| 2017/0241499 A1 | | 8/2017 | Kosov |
| 2018/0142752 A1 | | 5/2018 | Senneff |

FOREIGN PATENT DOCUMENTS

| | | | | |
|---|---|---|---|---|
| DE | 10302790 | B3 | | 7/2004 |
| DE | 102008007092 | A1 | * | 8/2009 |
| DE | 102017120436 | A1 | | 3/2019 |
| EP | 1530312 | A1 | | 5/2005 |
| EP | 2893212 | A1 | | 7/2015 |
| JP | H08159216 | A | | 6/1996 |
| JP | 2016-211691 | A | | 12/2016 |
| WO | WO-2011017344 | A2 | * | 2/2011 ............ F16F 1/3935 |
| WO | 2014038995 | A1 | | 3/2014 |

OTHER PUBLICATIONS

German Office Aciton, 10 2021 101 999.0, dated Aug. 17, 2021, with translation.

German Office Action, 10 2021 101 999.0, dated Jul. 19, 2024, with translation.

* cited by examiner

ELASTIC BEARING

CROSS-REFERENCE TO RELATED APPLICATIONS

This application claims priority to German Patent Application No. DE 10 2021 101 999.0, filed Jan. 28, 2021, the contents of which are hereby incorporated by reference in its entirety.

TECHNICAL FIELD

The invention relates to an elastic bearing.

BACKGROUND

Elastic bearings are known from practice and can comprise a mass, such as an absorber mass, and a mounting sleeve inserted in a mounting hole of the mass. The sleeve can be used to connect a vibrating device (absorber function) and/or a device against which vibrations are to be isolated (decoupling function). An elastomer layer is arranged between the mass and the mounting sleeve. In automotive engineering, for example, it is common to realize an undercut between the mass and the mounting sleeve by means of a radial collar section of the sleeve which has a larger diameter than the fastening bore. A common mounting sleeve comprises a cylindrical section capable of supporting the cylindrical elastomer body, in which a radial overlap between the elastomer layer and the fastening bore provides a cylindrical interference fit with sufficient frictional force.

Due to the high number of operating vibration cycles and individual large-amplitude vibration events with corresponding relative movement between the mass and the mounting sleeve in combination with possibly increased temperature, the frictional connection on the elastomer layer may not prevent axial migration of the mass. The pretensioning of the elastomer layer can also cause axial migration of the mass in the long term. After permanent axial displacement of the mass relative to the mounting sleeve, metallic contact with the device can occur or the mass can become completely blocked, with the result that the absorber effect or decoupling effect is no longer present. In addition, axial slippage cannot be excluded or reliably prevented by cardanic levering.

It is therefore the task of the invention to create a resilient bearing that enables a more durable and process-reliable fixation of the mounting sleeves over the entire service life.

Features and embodiments of the invention are disclosed herein.

SUMMARY

According to the invention, an elastic bearing is proposed comprising a mass which has at least one mounting hole for a mounting sleeve, the mounting hole being penetrated by a central longitudinal axis, at least one mounting sleeve having a collar section extending in the radial direction and a shaft section extending in the longitudinal direction, the mounting sleeve being fixed in the mounting hole, and an elastomer body which is arranged on the outer circumferential side of the mounting sleeve, the elastomer body having in the region of the shaft section a diameter-widening contour whose diameter increases with increasing longitudinal distance from the mounting sleeve, which is arranged on the outer circumferential side of the mounting sleeve, the elastomer body having, in the region of the shaft portion, a diameter-widening contour whose diameter increases with increasing longitudinal distance from the collar portion, and the mounting hole having a diameter-widening contour which widens to the same extent as the diameter-widening contour of the elastomer body, the elastomer body being prestressed by the mass and the mounting sleeve at least in the radial direction.

Due to the diameter-widening contour of the elastomer body, axial expansion of the mounting sleeve in both axial directions can now be reliably prevented. The elastomer body, which can be frustoconical at least in the area of the shaft section, has a radial overlap with the inner contour of the mounting hole. When an axial force is applied, a "normal force" is generated in the friction surface to the elastomer body and/or to the mass, depending on the arrangement of the elastomer body, which prevents unintentional migration out. In addition, the diameter-widening contour of the elastomer body means that the mounting sleeve can return to its original position even after large-amplitude vibration events, since the normal component due to the inclined position of the diameter expansion is higher than with a purely cylindrical interference fit. In addition to the higher normal component, a classic form fit may also be present at the larger diameter of the diameter extension. It is conceivable that the larger diameter of the contour is located on a screw-on side, i.e. on the side into which a fastener or screw can be screwed in order to be screwed to a device there. The device to be insulated from can be, for example, a car body. The elastic bearing can be, for example, a vibration damper, a rubber bearing or a bearing bush. The mass can be, for example, an absorber mass or an auxiliary/secondary unit or a fastening component.

The largest outer diameter of the diameter-widening contour of the elastomer body is larger than the smallest inner diameter of the mounting hole (which may also be referred to as a fastening bore or mounting bore) through which the mounting sleeve is to be inserted. As a result, the elastomer body has a radial overlap with the inner contour of the mass. It is therefore advantageous that the elastomer body can be pushed away during assembly when the mounting sleeve is inserted into the fastening bore. After assembly, the elastomer body is supported by the high rigidity of the mass and/or the mounting sleeve.

The diameter-widening contours of the fastening bore and the mounting sleeve can run parallel to each other in longitudinal section.

According to a possible further development of the bearing according to the invention, the elastomer layer can be supported by the mass or by the mounting sleeve or vulcanized there. The latter embodiment improves a manufacturing process in that the entire mass does not have to be inserted into the mold for vulcanization, which saves a great deal of space in the mold and energy that would otherwise be required to heat the mass. Alternatively, the elastomer layer can be a separate component, which is only in force-fit and/or form-fit contact with the compound and the sleeve.

According to a further development of the bearing according to the invention, the mounting sleeve can have a diameter-widening contour in the region of the shaft section, which expands to the same extent as the diameter-widening contour of the elastomer body. Pressing away of the elastomer body after assembly is prevented even more reliably by this rear structure, since the mounting sleeve cannot be compressed and offers the elastomer body no space to escape.

According to a further development of the bearing according to embodiments of the invention, the elastomer body can have a collar portion (which may also be referred to as a collar region) which is supported by the collar section and bears against a step in the fastening bore. The elastomer body thus has at least two sections, namely a clamping region in the region of the shaft section of the mounting sleeve, which has the diameter-widening contour, and the axially acting collar region. The collar region can be overpressed and briefly compressed during assembly, but the force region pulls the mounting sleeve into the assembly position after the pressure is released. To increase the axial or cardanic resistance (with regard to axial/wobble frequency), an elastomer layer can also be arranged in an annular gap between the collar section of the mounting sleeve and a surface of the mass opposite in the radial direction, preferably in one piece with the elastomer body.

In accordance with a further development of the bearing, the diameter-widening contour of the elastomer body and the collar region can be designed to preload the elastomer body in the axial direction. For example, by a suitable selection of the geometry and/or arrangement of the diameter-widening contour of the elastomer body and the collar region, both are arranged in an equilibrium position under preload. This results in opposing forces acting on the mounting sleeve.

In accordance with a further development of the bearing according to the invention, the elastomer body can have a cavity region which is supported by the shaft section and forms a cavity with the fastening bore. The hollow space region may be arranged in the axial direction between the collar region and the clamping region, preferably directly at least with respect to the clamping region. The outer diameter of the cavity area of the elastomer body can be smaller than the inner diameter of the radially opposite inner surface of the fastening bore. The cavity region serves to facilitate assembly, since the elastomer pushed away by the overlap can press into the cavity region and thus escape. The cavity region can comprise an annular groove which is recessed in the radial direction relative to the diameter-widening contour of the elastomer body or at least relative to an adjacent section.

Pursuant to a further development of the bearing according to the invention, the mounting sleeve can have a support section extending in the radial direction, which can be arranged adjacent to the largest diameter of the diameter-expanding contour of the elastomer body. An axial gap between the support section and the largest diameter of the diameter-expanding contour of the elastomer body is also conceivable. In order to increase the clamping effect, the mounting sleeve can have the additional support section, which need not have any bond to or contact with the elastomer body. However, if there is an axial gap, a bond or no bond between the elastomer and the inner sleeve, the elastomer body can deform more easily relative to the support section, thus facilitating insertion into the fastening bore. In the event of disassembly, on the other hand, the elastomer body may be massively supported by the support section. The support section can have an outer diameter that is smaller than the smallest inner diameter of the fastening bore, so that the sleeve can be mounted easily.

According to a further development of the bearing according to the invention, the diameter-widening contour of the elastomer body can be designed as a truncated cone contour or as a partial ovoid contour. In this way, the support behavior can be influenced.

According to a further development of the bearing according to the invention, the mounting sleeve can have a central passage through which a fastening element, in particular a screw, can pass in the direction of the screw-on side. Preferably, the central passage is designed without an internal thread.

According to a further development of the bearing according to the invention, the elastomer body and/or the mounting bore can have an inlet chamfer for the respective other element. The at least one inlet slope is tilted with respect to a cross-sectional plane. This considerably simplifies assembly, since a deformation direction can be specified for the elastomer body and at the same time centering of the elastomer body or mounting sleeve and mounting bore can be performed.

BRIEF DESCRIPTION OF THE DRAWINGS

Further features, details and advantages of the invention are apparent from the wording of the claims and from the following description of embodiments based on the drawings. Showing:

FIG. 1a generally illustrates a pre-assembly position of a fastening sleeve according to the invention first version in longitudinal section;

FIG. 1b generally illustrates an assembly position of the mounting sleeve according to FIG. 1a.

DETAILED DESCRIPTION

In the figures, identical or corresponding elements are each designated with the same reference signs and are therefore not described again unless appropriate. Features already described are not described again to avoid repetition and are applicable to all elements with the same or corresponding reference signs, unless explicitly excluded. The disclosures contained in the entire description are applicable mutatis mutandis to identical parts with identical reference signs or identical component designations. Also, the positional indications selected in the description, such as top, bottom, side, etc., are related to the directly described as well as depicted figure and are to be transferred mutatis mutandis to the new position in the event of a change of position. Furthermore, individual features or combinations of features from the different embodiment examples shown and described can also represent independent, inventive solutions or solutions according to the invention.

Figure 1:
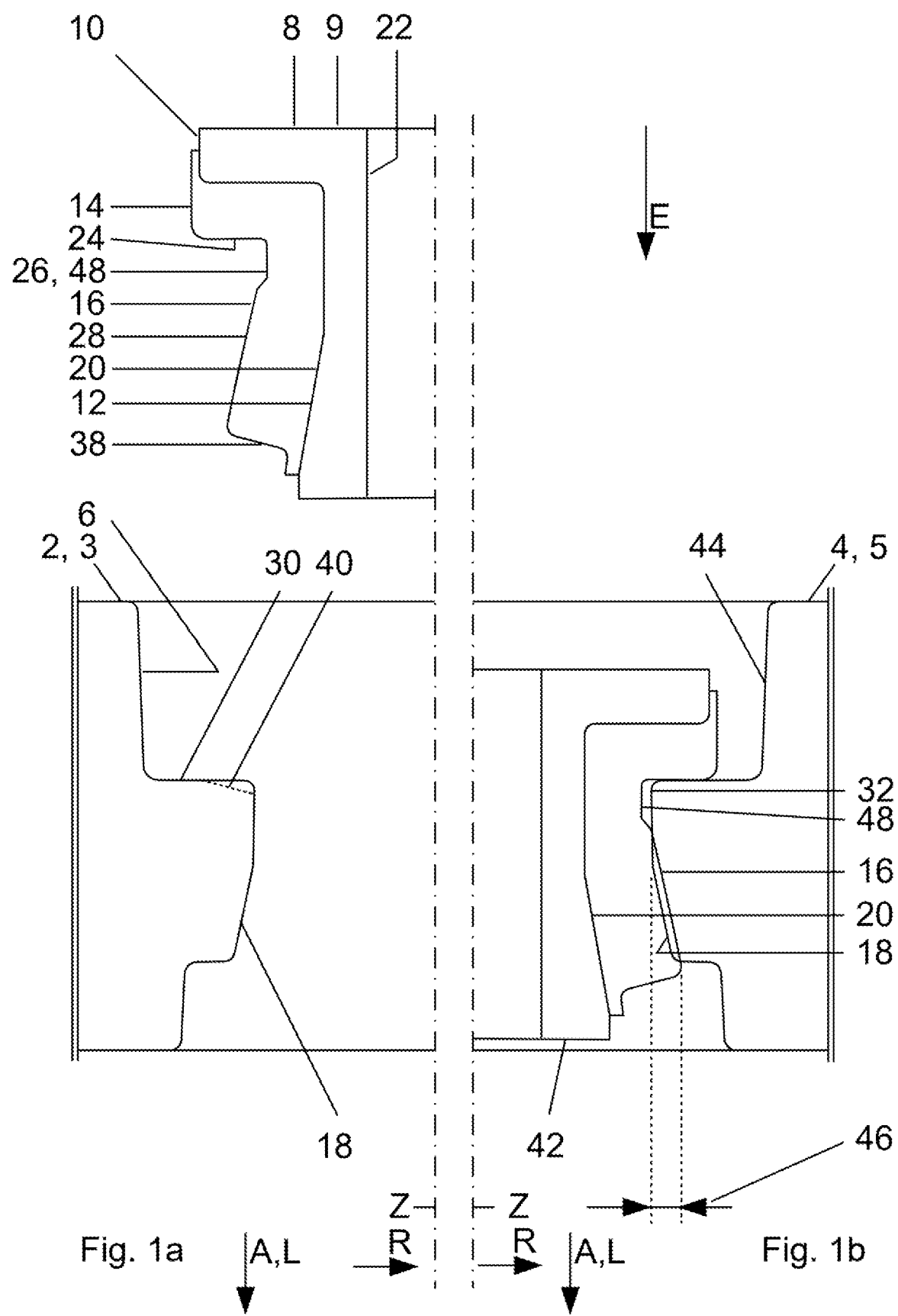

FIGS. 1a and 1b show half-sided views of identical elastic bearings 2 shown as vibration dampers 3. FIG. 1a shows a pre-assembly position in which a mounting sleeve 8 (which may also be referred to as a fastening sleeve) has not yet been placed in a mounting hole 6, and FIG. 1b shows an assembly position in which this placement in a screw-in direction E has already been carried out. Therefore, reference signs can be transferred to the respective other figure.

The bearing 2 comprises a mass 4, which is shown as an absorber mass 5. The mass 4 comprises at least one mounting hole 6, which is designed to be continuous. A central longitudinal axis Z passes through the mounting hole 6 in the axial direction A and longitudinal direction L respectively. The mounting hole 6 has a contour 18 on the inner circumference. The bearing 2 also comprises at least the one mounting sleeve 8, which comprises a base body 9 with a collar section 10 extending in radial direction R and a shaft section 12 extending in longitudinal direction L. The mounting hole 6 and/or the mounting sleeve 8 may or may not be rotationally symmetrical with respect to the central longitudinal axis Z. The mounting sleeve 8 has a central through-hole 22 extending along the central longitudinal axis Z, through which a fastening element, in particular a screw, can engage in the direction of screw-in E towards a screw-on side 42 through the central through-hole 22 and be screwed there to a device. An elastomer body 14 is arranged on the outer circumference of the mounting sleeve 8, which can also be vulcanized onto the mounting sleeve 8. The elastomer body 14 has a contour 16 on the outer circumferential side. The elastomer body 14 can be rotationally symmetrical with respect to the central longitudinal axis Z.

The longitudinal sectional courses of the contour 18 of the mounting hole 6 and of the contour 16 of the mounting sleeve 8 are matched to one another in such a way that in the assembly position they reliably prevent axial movement of the mounting sleeve 8 in at least the axial direction A. For this purpose, the contour 16 of the elastomer body 14 is designed to widen in diameter at least in the region of the shaft section 12, its diameter increasing with increasing longitudinal distance from the collar section 10. In addition, the mounting sleeve 8 has a diameter-widening contour 20 in the region of the shaft section 12, which expands to the same extent as the diameter-widening contour 16 of the elastomer body 14 in order to build behind the latter. In longitudinal section, the contours 16 and 20 run parallel.

The elastomer body 14 thus has, at least in sections, a truncated cone contour, the larger diameter of the contour 16 being located on the screw-on side 42. The diameter-widening contour 16 of the elastomer body 14 is supported by a clamping area 28 in the region of the shaft section 12 of the mounting sleeve 8. The elastomeric body 14 also has two further portions, namely a collar portion 24 which is carried by the collar section 10 and in the assembled position abuts a step 30 in the mounting hole 6, and a cavity area 26 which is carried by the shaft section 12 and forms a cavity 32 with the mounting hole 6. To form the cavity area 26, the elastomer body 14 has an annular groove 48 which recedes inwardly in the radial direction R with respect to the diameter-widening contour 16. An elastomer layer can also be arranged in an annular gap 44 between the collar section 10 of the mounting sleeve 8 and the opposite surface of the mas-se 4 in radial direction R.

The contour 18 of the mounting hole 6 is designed to widen in diameter, at least in sections. The contour 18 expands to the same extent as the diameter-widening contour 16 of the elastomer body 14. The diameter-widening contour 16 of the elastomer body 14 and its collar region 24 are dimensioned in relation to the mounting hole 6 in such a way that the elastomer body 14 is preloaded in the axial direction A and radial direction R. In the assembly position, the diameter-widening contour 16 and the collar region 24 are arranged in an equilibrium position under pretension.

FIG. 1a shows that the elastomer body 14 has a radial overlap 46 with the contour 18 of the mounting hole 6, at least at its point with the largest diameter. Thus, when the mounting sleeve 8 is mounted in the mounting hole 6, the elastomer body 14 can be pressed away from its unloaded state, preferably at least partially into the cavity 32 or the annular groove 48 formed there. Once the mounting sleeve 8 is completely inserted into the mounting hole 6, it can be pressed over in the screw-in direction E at the end of the assembly. This compresses the collar portion 24 and the clamping area 28 snaps forward or in the direction of the screw-on side 42. The collar portion 24 then pulls the mounting sleeve 8 a little way into the mounting hole 6 against its compression, counter to the screw-in direction E. The mounting sleeve 8 is then completely inserted into the mounting hole 6. After this, both the collar portion 24 and the mounting area 28 are mounted in an equilibrium position under pretension. In the opposite direction to the screwing-in direction E, no return travel or axial migration is possible due to the overlap 46, this effect being reinforced by the rear structure by means of contour 20.

For easier assembly, lead-in chamfers 38, 40 can be provided, whereby the lead-in chamfer 38 is arranged on the front side of the elastomer body 14 and the inlet chamfer 40 in the mounting hole 6 is only indicated in FIG. 1a. The inlet chamfers 38, 40 are tilted relative to a cross-sectional plane and taper in the direction of the screw-on side 42. The inlet chamfers 38, 40 can be designed parallel to one another in longitudinal section, but it is also conceivable with an advantage that the inlet chamfer 40 of the mounting hole 6 has a larger taper or encloses a larger angle with the cross-sectional plane.

Figure 2:
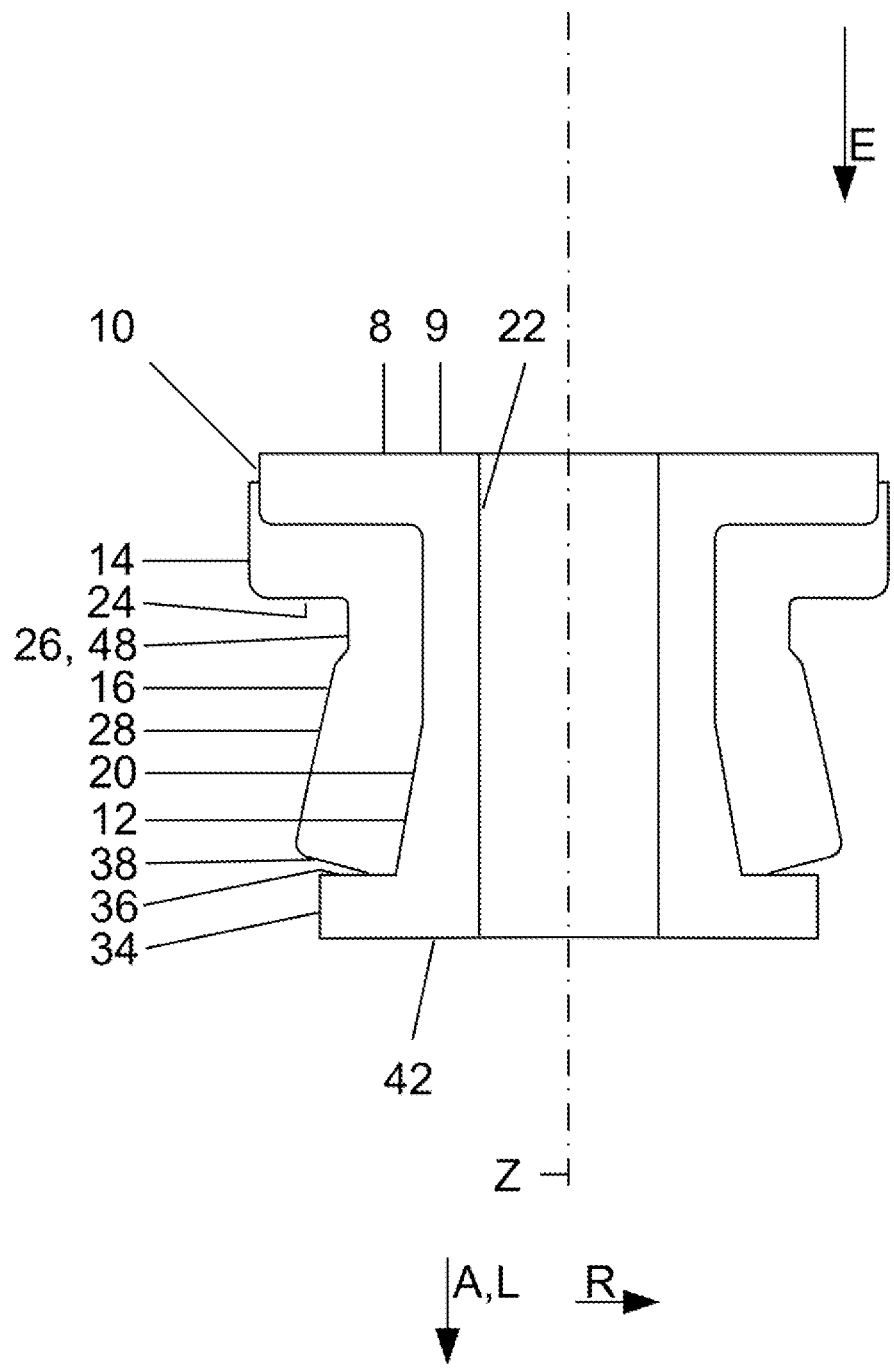
FIG. 2 generally illustrates a mounting sleeve of the second embodiment according to the invention in longitudinal section.

FIG. 2 also shows a mounting sleeve 8 according to the invention, but now in a stand-alone position. To avoid repetition, only the differences from the mounting sleeve 8 of FIGS. 1a and 1b will be described below.

The mounting sleeve 8 has a support section 34 extending in the radial direction R, which is formed on the side opposite the collar section 10. The support section 34 is arranged adjacent to the largest diameter of the diameter-widening contour 16 of the elastomer body 14, but this need not necessarily be so. Between the supporting section 34 and the elastomer body 14, an axial intermediate space 36 is formed which is wedge-shaped in longitudinal section. However, such an axial intermediate space 36 need not be present. The elastomer body 14 can also be supported by the support section 34 or vulcanized thereon. The support section 34 has an outer diameter which is smaller than the smallest inner diameter of the mounting sleeve 8.

The invention is not limited to one of the above-described embodiments, but can be varied in many ways. All features and advantages resulting from the claims, the description and the drawing, including constructional details, spatial arrangements and process steps, can be essential to the invention both individually and in the most varied combinations.

Within the scope of the invention are all combinations of at least two of the features disclosed in the description, claims and/or figures.

To avoid repetition, features disclosed according to the invention should also be considered as disclosed according to the process and be claimable. Likewise, features disclosed according to the method should be considered as disclosed according to the invention and be claimable.

The invention claimed is:

1. An elastic bearing, comprising:
   a mass having a mounting hole, the mounting hole having a central longitudinal axis,
   a mounting sleeve having a collar section extending in a radial direction and a shaft section extending in a longitudinal direction, the mounting sleeve fixed in the mounting hole, and
   an elastomer body arranged on an outer circumferential side of the mounting sleeve,
   wherein the elastomer body has a collar portion abutting a step in the mounting hole, and the collar portion is configured to be over-pressed and briefly compressed during assembly, such that the collar portion pulls the mounting sleeve into an assembly position after the pressure is released; and
   wherein the elastomer body has, in a region of the shaft section, a diameter-widening contour whose diameter increases with increasing longitudinal distance along a segment of the elastomer body from a position adjacent the collar section, and the mounting hole has a diameter-widening contour which widens to the same extent as the diameter-widening contour of the elastomer body, and the elastomer body is prestressed by the mass and the mounting sleeve at least in a radial direction.

2. The elastic bearing according to claim 1, wherein the mounting sleeve has, in a region of the shaft section, a diameter-widening contour which expands to the same extent as the diameter-widening contour of the elastomer body.

3. The elastic bearing according to claim 1, wherein the collar portion of the elastomer body is supported by the collar section of the mounting sleeve.

4. The elastic bearing according to claim 3, wherein the diameter-widening contour and the collar portion preload the elastomer body in an axial direction.

5. The elastic bearing according to claim 1, wherein the elastomer body has a cavity section which is supported by the shaft section and forms a cavity with the mounting hole.

6. The elastic bearing according to claim 1, wherein the mounting sleeve has a support section extending in the radial direction, the support section provided adjacent to a largest diameter of the diameter-widening contour of the elastomer body.

7. The elastic bearing according to claim 1, wherein the diameter-widening contour of the elastomer body is configured to include a truncated cone contour or as a partial ovoid contour.

8. The elastic bearing according to claim 1, wherein the mounting sleeve has a central through-hole through which a fastening element can pass in the direction of a screw-on side.

9. The elastic bearing according to claim 1, wherein the elastomer body or the mounting hole have an inlet chamfer for the respective other element of the elastomer body and the mounting hole.

10. The elastic bearing according to claim 1, wherein the elastomer body and the mounting hole each have an inlet chamfer for the respective other element of the elastomer body and the mounting hole.

* * * * *